(12) United States Patent
Embacher et al.

(10) Patent No.: US 11,485,487 B2
(45) Date of Patent: Nov. 1, 2022

(54) ROTORCRAFT WITH A STABILIZER WING

(71) Applicant: AIRBUS HELICOPTERS DEUTSCHLAND GMBH, Donauworth (DE)

(72) Inventors: Martin Embacher, Augsburg (DE); Tobias Ries, Nordendorf (DE); Christian Eckert, Augsburg (DE); Thomas Kneisch, Gernsbach (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 76 days.

(21) Appl. No.: 16/802,998

(22) Filed: Feb. 27, 2020

(65) Prior Publication Data

US 2020/0339253 A1 Oct. 29, 2020

(30) Foreign Application Priority Data

Apr. 26, 2019 (EP) ..................................... 19400011

(51) Int. Cl.
*B64C 27/82* (2006.01)
*B64C 27/26* (2006.01)

(52) U.S. Cl.
CPC .............. *B64C 27/82* (2013.01); *B64C 27/26* (2013.01); *B64C 2027/8281* (2013.01)

(58) Field of Classification Search
CPC ... B64C 2027/8281; B64C 27/26; B64C 3/10; B64C 5/02; B64C 39/029
See application file for complete search history.

(56) References Cited

U.S. PATENT DOCUMENTS 3,464,650 A 9/1969 Girard
3,902,688 A 9/1975 Seibel et al.
(Continued)

FOREIGN PATENT DOCUMENTS

CN 103979105 A 8/2014
CN 105366033 A * 3/2016
(Continued)

OTHER PUBLICATIONS

European Office Action dated Jan. 28, 2021, Application No. 19 400 011.3-1010, Applicant Airbus Helicopters Deutschland GMBH, 5 Pages.
(Continued)

*Primary Examiner* — Richard R. Green
*Assistant Examiner* — William L Gmoser
(74) *Attorney, Agent, or Firm* — Brooks Kushman P.C.

(57) ABSTRACT

A rotorcraft, and, more particularly, to a rotorcraft with a fuselage having a center line, at least one main rotor that generates vortices during operation, and a stabilizer wing, whereby the stabilizer wing has a planform that reduces the unsteady aerodynamic loads caused by the wake of the at least one main rotor. In particular, the stabilizer wing may be provided with a left wing tip, a right wing tip, a quarter chord line with a non-zero curvature, such that an interaction between the vortices generated by the at least one main rotor and the quarter chord line is spread out over time, a leading edge that is arc-shaped, and a trailing edge that is arc-shaped.

18 Claims, 6 Drawing Sheets

(56) References Cited

U.S. PATENT DOCUMENTS

| | | | | |
|---|---|---|---|---|
| 4,809,931 A | * | 3/1989 | Mouille | B64C 27/82 |
| | | | | 244/17.11 |
| 5,738,301 A | * | 4/1998 | Francois | B64C 27/26 |
| | | | | 244/17.19 |
| 10,450,062 B1 | * | 10/2019 | Bova | B64C 5/06 |
| 2010/0123047 A1 | * | 5/2010 | Williams | B64C 39/028 |
| | | | | 244/35 R |
| 2012/0018570 A1 | | 1/2012 | Borie et al. | |
| 2014/0084105 A1 | | 3/2014 | Eglin | |
| 2016/0031554 A1 | | 2/2016 | Eshkenazy et al. | |
| 2019/0161164 A1 | * | 5/2019 | Fukari | B64C 5/02 |

FOREIGN PATENT DOCUMENTS

| | | | |
|---|---|---|---|
| CN | 106516082 A | 3/2017 | |
| CN | 108583867 A | 9/2018 | |
| EP | 0254605 A1 | 1/1988 | |
| EP | 2409917 A1 | 1/2012 | |
| EP | 2666719 A1 | 11/2013 | |
| EP | 2899118 A1 | 7/2015 | |
| WO | 1999067130 A1 | 12/1999 | |
| WO | 2005005250 A2 | 1/2005 | |
| WO | 2009155584 A1 | 12/2009 | |
| WO | WO-2010150212 A2 * | 12/2010 | B64C 3/10 |

OTHER PUBLICATIONS

European Search Report for European Application No. EP 19400011. 3, Completed by the European Patent Office, dated Sep. 2, 2019, 7 pages.

* cited by examiner

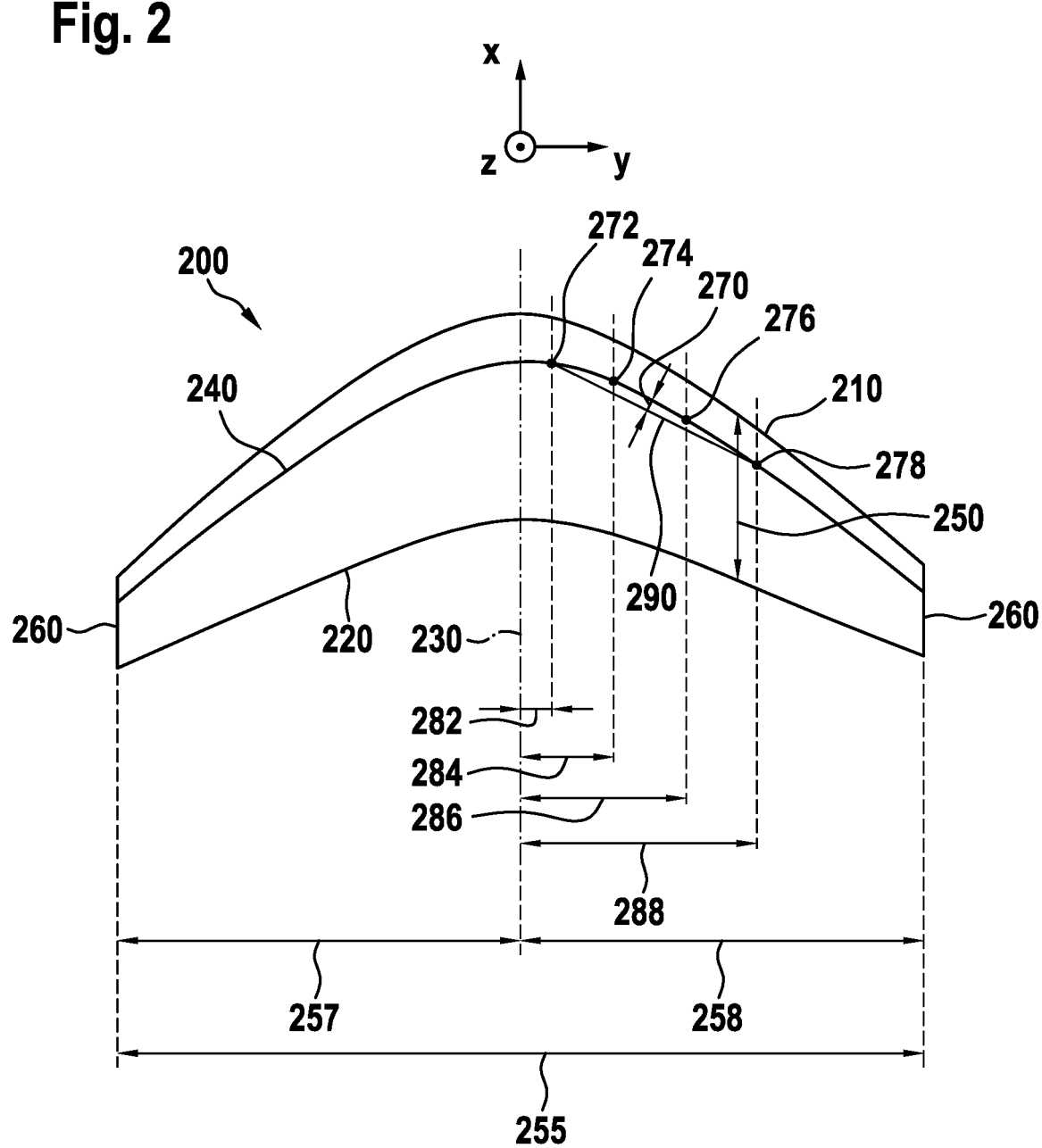

ROTORCRAFT WITH A STABILIZER WING

CROSS-REFERENCE TO RELATED APPLICATIONS

This application claims priority to European patent application No. EP 19400011.3 filed on Apr. 26, 2019, the disclosure of which is incorporated in its entirety by reference herein.

BACKGROUND OF THE INVENTION

(1) Field of the Invention

The present embodiments relate to a rotorcraft, and, more particularly, to a rotorcraft with at least one main rotor and a stabilizer wing, whereby the stabilizer wing has a planform that reduces the unsteady aerodynamic loads caused on it by the wake of the at least one main rotor.

(2) Description of Related Art

A rotorcraft is usually equipped with one or more wings that help to improve the stability and the handling of the rotorcraft during a flight. Therefore, such wings are sometimes also referred to as horizontal stabilizers, horizontal stabilizer wings, or stabilizer wings.

Conventionally, helicopters have one or more stabilizer wings placed at the rear end of a tail-unit. In some models, stabilizer wings protrude from a rear part of the tail boom or from the fin. In other models, a single stabilizer wing is placed on top of the fin. The latter configuration in which a single stabilizer wing is placed on top of the fin is sometimes also referred to as a T-tail.

Due to the location of the stabilizer wings at the aft region of the rotorcraft, they are typically subject to the air flow structures created by the at least one main rotor. These air flow structures, which are sometimes also referred to as wake or rotor wake, interact with the stabilizer wings and determine the aerodynamic load on the stabilizer wings.

The strength of the interaction between a rotor wake and a stabilizer wing depends on the positioning of the stabilizer wing relative to the rotor and on the flight state (e.g., during take-off and landing or during horizontal flight). However, the generation of aerodynamic loads on the stabilizer wing that are significant for the structural sizing of the stabilizer wing can usually not be avoided.

The stabilizer wing generates a certain amount of static aerodynamic load on purpose (e.g., to improve the stability and the handling of the rotorcraft during a flight). However, unwanted unsteady aerodynamic loads also result from the interaction of the rotor wake with the stabilizer wing.

These unsteady aerodynamic loads can sometimes reach significant amplitudes, which can lead to fatigue failures of the stabilizer wing. Therefore, special attention during the development of the stabilizer wing is often required to guarantee a structural design that significantly reduces the risk of fatigue failures caused by the unwanted unsteady aerodynamic loads.

The problem is often exacerbated by the fact that one of the dynamic natural frequencies of the stabilizer wing and the tail boom is close to the excitation frequency of the rotor wake. Such resonance conditions between the rotor wake and the stabilizer wing can be avoided by increasing either the structural stiffness or the mass of the stabilizer wing.

However, increasing the structural stiffness or the mass of the stabilizer wing adds weight in a sensitive area of the rotorcraft as it moves the center of gravity further to the rear. Especially when the stabilizer wing is placed on the fin, the structural and dynamical issues are difficult to solve. As a result, stabilizer wings are rarely placed on the fin, which would otherwise be very beneficial for handling quality and performance.

Instead, most conventional solutions place the stabilizer wing at a position that is in vertical direction below the rotor plane (e.g., at the tail boom). As a result, the interaction between the rotor wake and the stabilizer wing mostly occurs at lower flight speeds. Since air loads increase with flight speed, an interaction between the rotor wake and the stabilizer wing at lower flight speeds generates comparatively moderate unsteady aerodynamic loads, while the static air load on the stabilizer wing is comparatively low. Thus, since the stabilizer wing's structure is subject to the superposition of the static air load and the unsteady aerodynamic loads, the stabilizer wing's structure does not reach its fatigue limits at lower flight speeds.

At high flight speeds, the rotor wake has changed its trajectory and passes above a low-positioned stabilizer wing (i.e., a stabilizer wing that is located at the tail boom, for instance). Thus, even though the static air load on the stabilizer wing is greater at high flight speeds than at low flight speeds, the comparatively small amplitude of unsteady aerodynamic loads of a low-positioned stabilizer wing has the effect that the total air load remains well within the envelope of the fatigue limits.

However, a low-positioned stabilizer wing exhibits reduced handling qualities and performance compared to a high-positioned stabilizer wing (e.g., a stabilizer wing on top of the fin). For example, during hover and/or at low flight speed the low-positioned stabilizer wing lies within the rotor downwash and generates a force directed to the ground, which is sometimes also referred to as downforce. This downforce causes the rotorcraft to pitch up the nose region, which is sometimes also referred to as nose-up pitching.

A nose-up pitching can severely reduce the pilot's vision towards the ground. The nose-up pitching further generates a relatively high stress in the rotor mast. Moreover, the downforce can significantly reduce the payload of the rotorcraft. As an example, the downforce can reduce the payload of a helicopter in the three to four tons class by an amount that is equivalent to one passenger.

Furthermore, a low-positioned stabilizer wing usually has to be mounted at the tail boom. This leads to a shorter lever arm and thereby to a reduced stabilizing effect compared to a high-positioned stabilizer wing.

Some helicopter manufacturers try to overcome the dilemma between handling and performance on one hand and flight stability on the other hand by adopting a high-positioned stabilizer wing. However, as mentioned above, these high-positioned stabilizer wings face the problem of strong unsteady aerodynamic loads caused by the interaction with the rotor wake in cruise flight.

As the unsteady aerodynamic loads pose serious structural problems, a relatively small number of helicopters designed up to date features the high-positioned stabilizer wing. Often, helicopters with high-positioned stabilizer wings include additional means to reduce the unsteady aerodynamic loads. Among such means is the tapering of the stabilizer wings (i.e., the stabilizer wing has a chord length that is longer at the root than at the tips) or the inclusion of structural reinforcements. These reinforcements typically consist of thickening the stabilizer wing at its connection to the tail boom or fin, or installing struts that externally support the stabilizer wing.

For example, the AV-02 Hughes YAH-64 Advanced Attack Helicopter has a T-Tail (i.e., a stabilizer wing on the fin) with sweep (i.e., the stabilizer wing angles backwards from the root to the tips) and tapering. The Agusta-Bell BA609 features a T-Tail with tapering, whereby the stabilizer wing has straight leading and trailing edges. The RAH-66 Comanche has a T-Tail with a straight stabilizer wing (i.e., a stabilizer wing on top of the fin with straight leading and trailing edges but without a sweep). The Kamov Ka-60 has a T-Tail with a straight stabilizer wing and struts to the fin.

Both measures, the tapering of the stabilizer wing and the reinforcements, are disadvantageous from an aerodynamic point of view, as they increase drag, reduce the effectiveness of the stabilizer wing, and diminish the range of flight states in which the stabilizer wing has the capability to stabilize the rotorcraft.

The document EP 2 899 118 A1 describes a rotorcraft with a fuselage and at least one main rotor, said at least one main rotor being drivable for controlling an associated pitch attitude of said rotorcraft in operation, and said fuselage being equipped with at least one passive wing-type aerodynamic device that is adapted for generating independently of said associated pitch attitude a lift force acting on said fuselage, said lift force being oriented perpendicular to an air flow that is directed in operation of said rotorcraft against said passive wing-type aerodynamic device. The rotorcraft further comprises a fin with a rudder and a tail wing in the form of a T-tail provided at the tail boom of the fuselage. The tail wing may be adjustable in its inclination and act as an additional lifting surface.

The document CN 103 979 105 A describes a vertical take-off and landing type variable-wing aircraft. The vertical take-off and landing type variable-wing aircraft comprises an aircraft body, a main wing, a left wing and a right wing, wherein the main wing is arranged at the lower part of the aircraft body; the left wing and the right wing are respectively connected to two ends of the main wing; a left wing rotation shaft sleeve and a right wing rotation shaft sleeve are mounted in the main wing; one set of left wing rotation shaft in the left wing rotation shaft sleeve is arranged in the left wing; one set of right wing rotation shaft in the right wing rotation shaft sleeve is arranged on the right wing; a left wing steering engine and a right wing steering engine are also arranged in the main wing; the left wing steering engine is used for driving the left wing rotation shaft to adjust the direction of the left wing; the right wing steering engine is used for driving the right wing rotation shaft to adjust the direction of the right wing. The vertical take-off and landing type variable-wing aircraft is capable of realizing the vertical take-off and landing of a model airplane and an unmanned aircraft, quickly realizing various flight states and effectively braking and moving backward in the flight.

The document EP 2 666 719 B1 describes an aircraft that includes a fuselage, at least one main rotor provided with a plurality of blades, at least a pusher propeller with variable pitch, at least one aerofoil and at least one motor rotationally driving the main rotor and each pusher propeller. The aerofoil may comprise two half-wings positioned either side of the fuselage and at least one horizontal stabilizer positioned at one end of the aircraft and provided with at least one moving surface.

The document WO 1999/067130 A1 describes a horizontal stabilizer defining first and second spanwise stations wherein the first spanwise station defines a first angle of incidence and the second spanwise station defines a second angle of incidence and wherein the angle of incidence is different from one station to the other, e.g., one is greater than the other. The horizontal stabilizer functions to favorably affect the spanwise lift distribution to reduce the bending moments about its mounting interface. Various embodiments of the horizontal stabilizer include the use of vertically extending tabs along the trailing edge of the horizontal stabilizer, a stepped-transition to abruptly change the angle of incidence from one station to another, and a distributed twist which gradually changes the angle of incidence.

The document EP 0 254 605 A1 describes a directional and stabilizing device that comprises a ducted tail rotor driven in rotation in a transverse seam formed in a fairing inclined to the vertical by an angle between 0 and 45. It also includes a tail "in-V" attached to the top of the shroud and the two aerodynamic surfaces extend asymmetrically relative to the vertical plane passing through the apex of the fairing. The aerodynamic surfaces and are inclined at angle ranges between 0 and 45.

The document U.S. Pat. No. 3,464,650 A describes an aircraft with a flapped rotor/wing for vertical and short take-off and landing (V/STOL) performance. On top of a vertical tail, the aircraft has a horizontal stabilizer, which may be of the all movable type, or have individually movable portions. These individual portions would act as conventional elevators, or could be connected to function as ailerons for roll control in forward flight in the manner of dual function elevation surfaces. Conventional aircraft controls are used to operate the horizontal stabilizer, and the rudder on the vertical tail, for control in forward flight.

Other stabilizer wings are exemplarily described in documents CN 106 516 082 A, US 2016/0031554 A1, WO 2005/005250 A2, U.S. Pat. Nos. 5,738,301 A, 3,902,688 A. These documents respectively describe stabilizer wings in a rotorcraft, which are at least similar to the above described stabilizer wings. The documents EP2409917 and WO2009155584 have been cited.

In summary, the interaction between rotor wake and horizontal stabilizer wings in rotorcrafts is dependent on the flight mode (i.e., hover, low-, or high-speed forward flight) and the placement of the stabilizer wing on the rotorcraft (i.e., low-positioned or high-positioned), which has an impact on the handling, the performance, and the flight stability. High-positioned stabilizer wings provide better handling, performance, and flight stability than low-positioned stabilizer wings. However, as mentioned above, high-positioned stabilizer wings face the problem of strong unsteady aerodynamic loads caused by the interaction with the rotor wake in cruise flight.

BRIEF SUMMARY OF THE INVENTION

It is, therefore, an objective to provide a rotorcraft with a fuselage, at least one main rotor, and a stabilizer wing. The stabilizer wing should reduce unsteady aerodynamic loads caused by the interaction with the rotor wake of the at least one main rotor while providing improved handling, performance, and flight stability compared to conventional stabilizer wings.

This objective is solved by a rotorcraft, which comprises the features of claim 1. More specifically, a rotorcraft may comprise a fuselage having a center line, at least one main rotor that generates vortices during operation, and a stabilizer wing that is connected to the fuselage. The stabilizer wing is provided with a left wing tip, a right wing tip, a quarter chord line with a non-zero curvature, such that an interaction between the vortices generated by the at least one main rotor and the quarter chord line is spread out over time, a leading edge that is arc-shaped, and a trailing edge that is arc-shaped.

Advantageously, in the rotorcraft with the at least one main rotor, the above-described stabilizer wing with the quarter chord line having the non-zero curvature leads to reduced unsteady aerodynamic loads caused by the wake of the at least one main rotor on the stabilizer wing. Such stabilizer wings may be used on any rotorcraft with at least one main rotor including vertical take-off and landing aircraft, multicopters, helicopters, drones, etc.

The stabilizer wing has a particular planform (i.e., a particular shape when seen from above). The particular planform of the stabilizer wing reduces the unsteady loads generated by the interaction with the rotor wake of the at least one main rotor. In contrast to existing stabilizer wing planforms, which are mostly rectangular or consist of two trapezoids, a planform is proposed in which the leading and trailing edges feature a curvature.

Accordingly, the quarter chord line of the stabilizer wing is curved. In other words, the line that connects all points that are located at a quarter of the chord length, which is the distance from the leading to the trailing edge of the stabilizer wing along the chord, from the leading edge, is curved. Having a curved quarter chord line advantageously changes the response of the stabilizer wing to the fluctuations of the rotor wake compared to stabilizer wings with a straight quarter chord line.

In fact, a rotor wake exhibits a regular pattern of air flow at cruise flight, and this pattern determines the temporal sequence of load states at the stabilizer wing. A curved quarter chord line alters the relation between the stabilizer wing and the rotor wake flow pattern by reducing the amplitude of unsteady loads. Thereby, the stabilizer wing becomes less receptive to momentary load states of the type that generate high stress at the connection of the stabilizer wing with the rotorcraft (e.g., at the tail boom or the fin), where the stabilizer wing is structurally sensitive. In particular the moment oscillations of the stabilizer wing around the longitudinal axis of the rotorcraft benefit from the reduced interaction between rotor wake and stabilizer wing because these moment oscillations are the most critical for the connection of the stabilizer wing with the rotorcraft from a structural point of view.

Since the proposed new planform of the stabilizer wing considerably reduces the unsteady loads of aerodynamic origin at the attachment location of the stabilizer wing, the attachment fitting of the stabilizer wing may be designed more weight-economically, and more space-economically (i.e., with less potentially negative impact on the aerodynamic shape of the interconnection region between stabilizer wing and tail boom or fin) than attachment fittings of conventional stabilizer wings.

Significant weight savings may be achieved thanks to the reduced unsteady aerodynamic loads. As an example, the stabilizer wing may require less structural reinforcements. As another example, the strength and the weight of the structures to which the stabilizer wing is attached (e.g., the tail boom or the fin) and to which the stabilizer wing transmits the unsteady aerodynamic loads may be structurally reduced as well.

The fin of a rotorcraft is often a structurally weak component. Therefore, a stabilizer wing with a curved quarter chord line that significantly decreases the unsteady loads caused by the rotor wake is especially beneficial when mounted to the fin. In fact, the aerodynamic interaction between the rotor wake and the stabilizer wing occurs at high speed and the unsteady loads at the stabilizer wing usually reach highest amplitudes when the stabilizer wing is mounted to the fin.

Moreover, the exposure time of the stabilizer wing to these high unsteady loads caused by the rotor wake amounts to a large fraction of the operation time of a rotorcraft. The large distance between the stabilizer wing and the fuselage renders the fin attachment into a joint, which responds with large deflections to stabilizer wing loads and exhibits a low natural frequency that is difficult to correct if needed from a structural dynamics point of view.

A stabilizer wing with a curved quarter chord line may achieve the decisive amount of unsteady load reduction that is necessary to realize the otherwise challenging design of a fin-mounted stabilizer wing. Several important benefits for handling quality and performance can be realized If a stabilizer wing with a curved quarter chord line is mounted to the fin as detailed in the shortcomings of the prior art.

According to one aspect, the fuselage extends in longitudinal direction between a nose region and an aft region, and the quarter chord line of the stabilizer wing is closer to the aft region at at least one of the left or right wing tips than at the center line of the fuselage.

According to one aspect, the fuselage extends in longitudinal direction between a nose region and an aft region, and the quarter chord line of the stabilizer wing is closer to the nose region at at least one of the left or right wing tips than at the center line of the fuselage.

According to one aspect, an absolute value of the non-zero curvature of the quarter chord line is greater than 0.2.

According to one aspect, the absolute value of the non-zero curvature of the quarter chord line is smaller than 4.

According to one aspect, the non-zero curvature of the quarter chord line evolves from a first value at a first distance from the center line of the fuselage to a second value at a second distance from the center line of the fuselage such that the non-zero curvature of the quarter chord line is non-constant between the first and second distance from the center line of the fuselage.

According to one aspect, the stabilizer wing has a half wing span between the center line and a wing tip of the left or right wing tips, wherein first, second, third, and fourth points are located on the quarter chord line at first, second, third, and fourth distances from the center line of the fuselage, respectively, wherein the first, second, third, and fourth distances amount to 10%, 30%, 50%, and 70% of the half wing span, respectively, wherein the non-zero curvature of the quarter chord line is non-zero between the first and fourth points, and wherein a straight line between the first and fourth points has a fifth distance from the quarter chord line between the second and third points that is greater than 2% of the half wing span.

According to one aspect, the quarter chord line is symmetrical to the center line of the fuselage.

According to one aspect, the stabilizer wing is mounted to at least one of the fuselage, a tail boom that is attached to the fuselage, or a vertical fin that is attached to the tail boom.

According to one aspect, the stabilizer wing has a constant chord length between the left and right wing tips of the stabilizer wing.

According to one aspect, the stabilizer wing has a chord length that decreases from the center line of the fuselage towards the left and right wing tips of the stabilizer wing.

According to one aspect, the stabilizer wing further comprises a left half wing having a first sweep, and a right half wing having a second sweep that is different than the first sweep.

According to one aspect, the left half wing has a quarter chord line with a first curvature, the right half wing has a quarter chord line with a second curvature, and the second curvature is different than the first curvature.

According to one aspect, the left half wing has a first length and the right half wing has a second length that is different than the first length.

According to one aspect, the stabilizer wing further comprises winglets.

According to one aspect, the rotorcraft may be embodied as a helicopter.

BRIEF DESCRIPTION OF THE DRAWINGS

Embodiments are outlined by way of example in the following description with reference to the attached drawings. In these attached drawings, identical or identically functioning components and elements may be labeled with identical reference numbers and characters and are, consequently, only described once in the following description.

FIG. 2 is a diagram of an illustrative stabilizer wing having a quarter chord line with a non-zero curvature in accordance with some embodiments.

DETAILED DESCRIPTION OF THE INVENTION

Figure 1A:
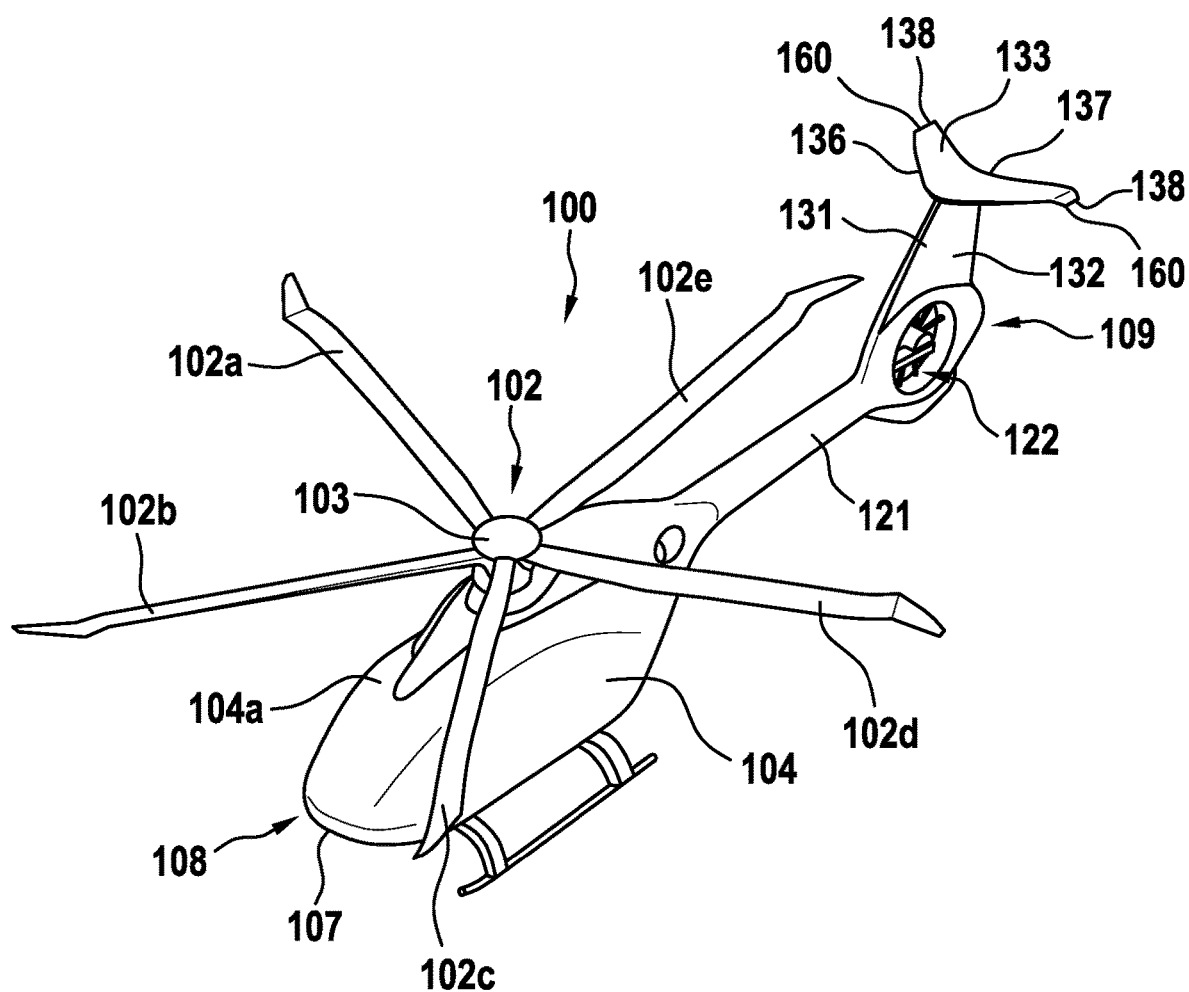
FIG. 1A is a diagram of an illustrative rotorcraft with a stabilizer wing in accordance with some embodiments.
Figure 1B:
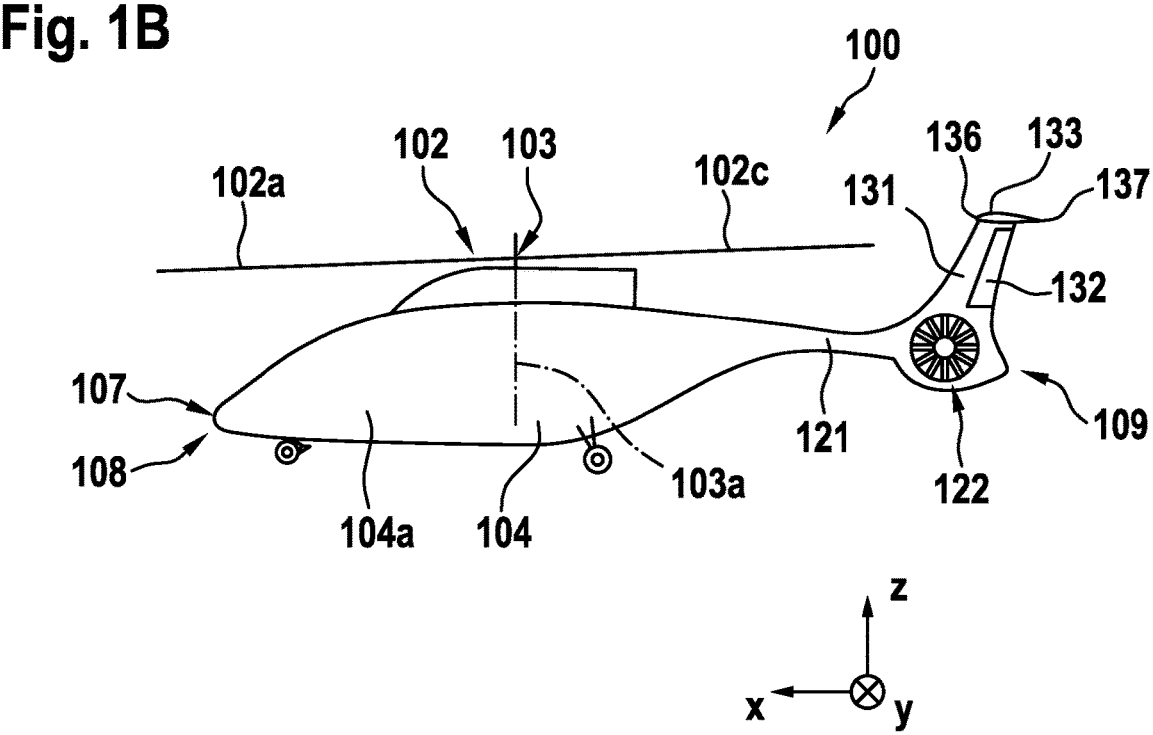
FIG. 1B is a simplified side view of an illustrative rotorcraft in accordance with some embodiments.
Figure 1C:
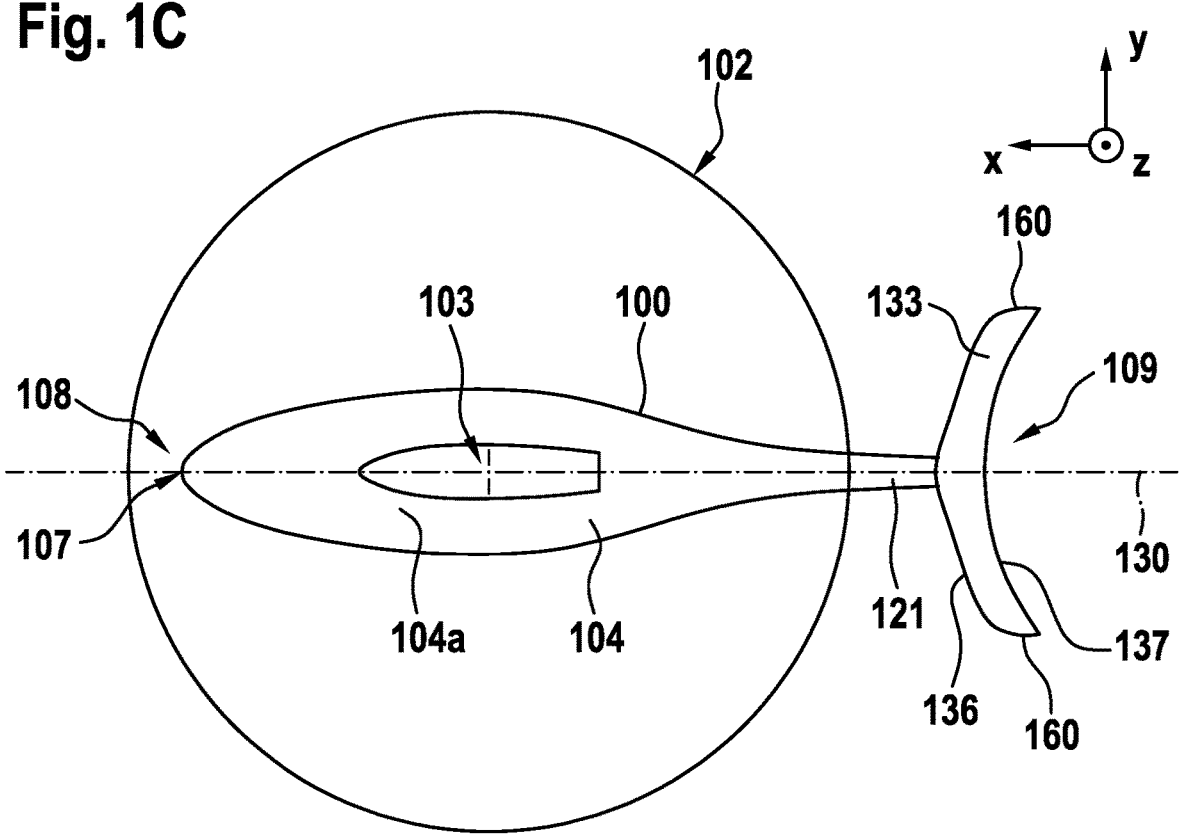
FIG. 1C is a simplified top view of an illustrative rotorcraft in accordance with some embodiments.

FIGS. 1A, 1B, and 1C show a rotorcraft 100 with a fuselage 104 and a main rotor 102. FIG. 1A shows a three-dimensional representation of rotorcraft 100, while FIG. 1B illustrates a simplified side view of rotorcraft 100 and FIG. 1C a simplified top view of rotorcraft 100.

The rotorcraft 100 is illustratively embodied as a helicopter and the main rotor 102 is illustratively embodied as a hingeless or a hinge- and bearingless multi-blade rotor having a plurality of rotor blades 102a, 102b, 102c, 102d, 102e.

It should, however, be noted that the present embodiments are not limited to helicopters and may likewise be applied to other rotorcrafts that are equipped with rotary wings, independent on whether these rotary wings define articulated, hingeless or hinge- and bearingless multi-blade rotors. It should further be noted that the present embodiments may also be applied in cases where more than one main rotor is provided.

In fact, exemplary embodiments may be included in any rotorcraft with at least one main rotor and a stabilizer wing, in which the unsteady aerodynamic loads caused by the wake of the at least one main rotor on the stabilizer wing should be reduced. Examples of such vehicles may include rotorcrafts such as vertical take-off and landing aircraft, multicopters, helicopters, drones, etc.

Illustratively, rotorcraft 100 may have a fuselage 104 that forms an airframe of rotorcraft 100. Fuselage 104 may be connected to a suitable landing gear and a rear fuselage. As an example, the landing gear may be a skid-type landing gear as shown in FIG. 1A. As another example, the landing gear may have wheels as shown in FIG. 1B. The rear fuselage may be connected to a tail boom 121. Fuselage 104 exemplarily forms a cabin 104a defining a fuselage nose 107 at a nose region 108 of rotorcraft 100.

FIGS. 1B and 1C show rotorcraft 100 in a cartesian coordinate system with axes X, Y, and Z. The X axis extends in longitudinal direction of rotorcraft 100 through nose region 108 and aft region 109 and is sometimes also referred to as longitudinal axis or length axis.

The Y axis extends in transversal direction of rotorcraft 100 through left and right wing tips 160 of stabilizer wing 133 and is sometimes also referred to as transversal axis, lateral axis, or width axis. The Z axis extends in vertical direction of rotorcraft 100 and is sometimes also referred to as vertical axis or height axis.

Fuselage 104 may have center line 130. Center line 130 may be parallel to or coincide with the X axis through main rotor center 103. In other words, the plane defined by the center line 130 and the Z axis may define a symmetry axis of fuselage 104 in transversal direction.

By way of example, rotorcraft 100 may include at least one counter-torque device configured to provide counter-torque during operation, i.e., to counter the torque created by rotation of the at least one multi-blade rotor 102 for purposes of balancing the rotorcraft 100 in terms of yaw. If desired, the counter-torque device may be shrouded. The at least one counter-torque device is illustratively provided at an aft region 109 of rotorcraft 100 and may have a tail rotor 122.

Aft region 109 of rotorcraft 100 may include fin 131 that is attached to tail boom 121, if desired. In some embodiments, fin 131 may be provided with a rudder 132. Rudder 132 may be adapted to provide for enhanced directional control and for optimized yaw trim of rotorcraft 100. If desired, rudder 132 can be deflected to large angles to reduce a given lateral drag of fin 131 in sideward flight.

Illustratively, fin 131 may be provided with a suitable horizontal stabilizer wing 133 in the form of a T-tail. In other words, as shown in FIGS. 1A and 1B, horizontal stabilizer wing 133 may be connected to fuselage 104 via fin 131 and tail boom 121. As shown, stabilizer wing 133 may be mounted to the top of fin 131.

If desired, stabilizer wing 133 may be mounted at another position of rotorcraft 100. For example, stabilizer wing 133 may be mounted directly to fuselage 104, to tail boom 121, and/or to fin 131 at a position that is in height axis Z below the top of fin 131.

Stabilizer wing 133 may be provided with left and right wing tips 160, a leading edge 136 that is arc-shaped, and a trailing edge 137 that is arc-shaped.

By way of example, stabilizer wing 133 may have a constant chord length. In other words, the chord of stabilizer wing 133, which is the imaginary straight line that joins leading edge 136 and trailing edge 137 of stabilizer wing 133, may have a constant length for every point on leading edge 136. If desired, stabilizer wing 133 may have a tapered chord length. In other words, the chord length of stabilizer wing 133 may be greater at the center line 130 of fuselage 104 than at left and right wing tips 160.

Illustratively, the quarter chord line of stabilizer wing 133, which is the imaginary line that connects all points on the different chords that are at a quarter of the respective chord length from the leading edge 136, may have a non-zero curvature.

As shown in FIGS. 1A and 1C, the quarter chord line of stabilizer wing 133 is curved backwards. In other words, when drawing a connection line between two arbitrary points on the quarter chord line of stabilizer wing 133, the quarter chord line segment in between these two arbitrary points is closer to the nose region 108 than the connection line.

If desired, the quarter chord line of stabilizer wing 133 may be curved forward. In other words, when drawing a connection line between two arbitrary points on the quarter chord line of stabilizer wing 133, the quarter chord line segment in between these two arbitrary points is closer to the aft region 109 than the connection line.

If desired, stabilizer wing 133 may have vertical or near-vertical extensions at the left and right wing tips 160. Such vertical or near-vertical extensions at the wing tips are sometimes also referred to as winglets 138. As shown in FIG. 1A, stabilizer wing 133 has downward-angled winglets 138. However, stabilizer wing 133 may have upward-angled winglets 138 or winglets 138 that extend upwards and downwards, if desired.

The main rotor 102 and, thus, the plurality of rotor blades 102a, 102b, 102c, 102d, 102e is drivable, i.e., controllable to influence an associated pitch attitude of the rotorcraft 100 in operation. Illustratively, the main rotor 102 defines a main rotor center 103 and comprises a rotor mast. The rotor mast has a rotor mast axis (e.g., rotor mast axis 103a of FIG. 1B) that defines a rotational axis of the main rotor 102.

During operation, main rotor 102 may generate air flow structures for providing lift and forward or backward thrust. Such air flow structures are sometimes also referred to as rotor wake or wake. The rotor wake of main rotor 102 may interact with stabilizer wing 133. In particular, the rotor wake may put an aerodynamic load on stabilizer wing 133.

The aerodynamic load on stabilizer wing 133 may be divided into a static aerodynamic load and an unsteady aerodynamic load. The static aerodynamic load is desirable because it improves flight stability and performance. The unsteady aerodynamic load is unwanted because it creates structural stress at the stabilizer wing 133 and the portions of rotorcraft 100 to which stabilizer wing 133 is attached.

The unsteady aerodynamic loads on stabilizer wing 133 are caused by changes in the air flow speed and/or the air flow direction and may cause lift changes at stabilizer wing 133. These lift changes on the stabilizer wing 133 occur as a response to flow changes at the quarter chord line of stabilizer wing 133.

Important changes in air flow speed and direction occur in the rotor wake in form of vortices. Vortices are volumes of air that revolve around an elongated, usually curved axis which is the center of the vortex. In rotorcraft 100, vortices are emanating from the tips of rotor blades 102a, 102b, 102c, 102d, 102e.

Due to the rotor blades' rotation and simultaneous forward motion in the direction of flight, the shape of the axis of a rotor tip vortex resembles that of a helix when seen from above. The helix, while created at the rotor blades' tips, is moving backwards relative to rotorcraft 100 during forward flight at a speed nearly identical to flight speed. A certain portion of the rotor blade tip vortices will travel by the stabilizer wing 133 and cause the unsteady aerodynamic loads.

Since lift changes on the stabilizer wing 133 occur as a response to flow changes at the quarter chord line of stabilizer wing 133, unsteady aerodynamic loads on the stabilizer wing 133 can be modeled approximately by the interaction between the rotor blade tip vortices and the quarter chord line of stabilizer wing 133.

As mentioned above, the quarter chord line of stabilizer wing 133 has a non-zero curvature. Thus, the interaction between the vortices generated by the at least one main rotor 102 and the quarter chord line may be spread out over time compared to stabilizer wings with a straight quarter chord line.

In fact, due to the helix pattern, rotor blade tip vortices periodically pass by the quarter chord line of stabilizer wing 133. For a rotor with N rotor blades, N helix-shaped rotor tip vortex systems are created, and hence N rotor blade tip vortices pass by stabilizer wing 133 per rotor revolution. Accordingly, the unsteady aerodynamic loads at stabilizer wing 133 occur periodically with fundamental frequency N per rotor revolution.

Thanks to the curved shape of the quarter chord line, the shape of the periodic unsteady aerodynamic loads at the attachment of stabilizer wing 133 at fin 131 or tail boom 121 may have smoother peaks and reduced amplitudes compared to a stabilizer wing with a straight quarter chord line. This is further illustrated in FIGS. 3A to 3C.

FIG. 2 shows an illustrative stabilizer wing having a quarter chord line with a non-zero curvature in accordance with some embodiments. As shown in FIG. 2, stabilizer wing 200 may have an arc-shaped leading edge 210, an arc-shaped trailing edge 220, and a quarter chord line 240 with a non-zero curvature.

The term "arc-shaped" as applied to leading edge 210 implies that leading edge 210 is curved at least partially between the wing tips 260. Preferably, leading edge 210 is curved at least in the vicinity of center line 230. If desired, arc-shaped leading edge 210 may be partially straight.

Similarly, the term "arc-shaped" as applied to trailing edge 220 implies that trailing edge 220 is curved at least partially between the wing tips 260. Preferably, trailing edge 220 is curved. If desired, arc-shaped trailing edge 220 may be partially straight.

Only by way of example and not to restrict the present embodiments accordingly, arc-shaped objects include at least partly C-shaped objects, objects shaped like a parabola segment, objects shaped like a segment of an ellipse, semi-oval objects, objects that are round in some portions and straight at other portions, etc.

As shown in FIG. 2, stabilizer wing 200 may have wing span 255 which may be the distance between the left and right wing tips 260. Wing span 255 may be the sum of a left half wing span 257 and a right half wing span 258, whereby the left half wing span 257 may be the distance between the left wing tip 260 and center line 230, and the right half wing span 258 may be the distance between the right wing tip 260 and the center line 230.

Illustratively, stabilizer wing 200 may have a chord length 250 that decreases from the center line 230 of the fuselage towards the left and right wing tips 260. In other words, stabilizer wing 200 may be tapered. If desired, stabilizer wing 200 may have a constant chord length for at least a portion of wing span 255.

Consider the scenario in which a coordinate system is introduced as shown in FIG. 2 with the Y axis as the lateral or transversal axis and the X axis as the length or longitudinal axis. Consider further that the Y axis is scaled such that the left and right wing tips 260 coincide with the coordinates Y=−1 and Y=1, respectively, and that the origin is on the center line 230. Consider further that the X axis shall be scaled such that the distance from the origin to X=1 is equal to the span of a half-wing.

If desired, in case of a stabilizer wing 200 with non-equal spans of the left and right half wings, an individual coordinate system for each half-wing may be introduced. However, as shown in FIG. 2, stabilizer wing 200 has equal spans of the left and right half wings 257, 258 and a quarter chord line 240 that is symmetrical to center line 230 of the fuselage.

In this scenario, quarter chord line 240 may be described as a function X=f(Y), whereby the curvature of the quarter chord line 240 is the second derivative d/dY (f(Y)). As the X axis is positive towards leading edge 210, a backward curvature (i.e., the opening of the curvature is oriented towards the aft region of the rotorcraft (e.g., aft region 109 of rotorcraft 100 of FIG. 1)) corresponds to negative values (i.e., d/dY (f(Y))<0), and a forward curvature (i.e., the opening of the curvature is oriented towards the nose region of the rotorcraft (e.g., nose region 108 of rotorcraft 100 of FIG. 1)) to positive values (i.e., d/dY (f(Y))>0), while a straight quarter chord line has a zero curvature (i.e., d/dY (f(Y))=0).

As an example, the absolute value of the non-zero curvature of the quarter chord line 240 may be greater than 0.2 (i.e., |d/dY (f(Y))|>0.2). As another example, the absolute value of the non-zero curvature of the quarter chord line 240 may be smaller than 4 (i.e., |d/dY (f(Y))|<4).

If desired, the absolute value of the non-zero curvature of the quarter chord line 240 may have an upper limit based on the distance from center line 230. For example, the absolute value of the non-zero curvature of the quarter chord line 240 may be smaller than 4−2*|Y| (i.e., |d/dY (f(Y))|<4−2*|Y|).

Illustratively, quarter chord line 240 may have a non-zero curvature (i.e., $d^2/dY^2$ (f(Y))≠0) over the entire wing span 255. If desired, quarter chord line 240 may have a non-zero curvature (i.e., $d^2/dY^2$ (f(Y))≠0) in the ranges Y=]0.1; 0.9] and Y=]−0.1; −0.9] or parts of these ranges. As an example, quarter chord line 240 may have a non-zero curvature at least in the ranges Y=]0.1; 0.7] and/or Y=]−0.1; −0.7].

In other words, considering only the right half wing (i.e., Y=]0.1; 0.7]), two points 272, 278 may be located on quarter chord line 240 at distances 282, 288 from center line 230 of the fuselage, respectively, such that the distances 282, 288 amount to 10% and 70% of the half wing span 257, 258, respectively, whereby the non-zero curvature of the quarter chord line 240 is non-zero at least between the two points 272, 278.

If desired, two additional points 274, 276 may be located on quarter chord line 240 at distances 284, 286 from center line 230 of the fuselage, respectively, such that the distances 284, 286 amount to 30% and 50% of the half wing span 257, 258, and a straight line 290 between the two points 272, 278 may have distance 270 from quarter chord line 240 between the two additional points 274, 276 that is greater than 2% of the half wing span 257, 258.

In some embodiments, the non-zero curvature of the quarter chord line 240 evolves from a first value at a first distance from the center line 230 of the fuselage to a second value at a second distance from the center line 230 of the fuselage such that the non-zero curvature of the quarter chord line 240 is non-constant between the first and second distance from the center line 230 of the fuselage.

As an example, quarter chord line 240 may have a curvature of 2.5 at center line 230 (i.e., |d/dY (f(Y))|=2.5 at Y=0) and decrease towards the left and right wing tips 260 to a curvature of 0.5 (i.e., |d/dY (f(Y))|=0.5 at Y=±1). As another example, quarter chord line 240 may have a curvature of 3.0 at center line 230 (i.e., |d/dY (f(Y))|=3.0 at Y=0) and decrease towards the left and right wing tips 260 to a curvature of 0.25 (i.e., |d/dY (f(Y))|=0.25 at Y=±1).

In some embodiments, quarter chord line 240 may have a kink. As an example, the kink in quarter chord line 240 may be at center line 230 (i.e., at Y=0). As another example, quarter chord line 240 may have a kink towards the left and right wing tips 260 (e.g., at Y=±0.95).

If desired, a family of embodiments may be conceived by an amount of mean curvature over a particular Y range. Thereby, the mean curvature over a range of Y values (i.e., in the interval [Y1: Y2]), is defined as the absolute value of the difference between the first derivative at the start of the range (i.e., d/dY(f(Y); Y=Y1)) and the first derivative at the end of the range (i.e., d/dY(f(Y); Y=Y2)) divided by (Y2−Y1). The amount of mean curvature is hence |(d/dY(f(Y); Y=Y1)−d/dY(f(Y); Y=Y2))/(Y2−Y1)|.

Examples for such families of embodiments are shown in Tables 1, 2, and 3. Table 1 shows the families of embodiments for Y1=0.1, Table 2 the families of embodiments for Y1=0.2, and Table 3 the families of embodiments for Y1=0.3. Additional families of embodiments are possible for different values of Y1 and/or Y2.

TABLE 1

|  | |Y1| = 0.1, |Y2| = 0.9 | |Y1| = 0.1, |Y2| = 0.8 | |Y1| = 0.1, |Y2| = 0.7 | |Y1| = 0.1, |Y2| = 0.5 |
|---|---|---|---|---|
| Amount of mean curvature ∈ ]0.2; 0.5] | Family 1a | Family 1b | Family 1c | Family 1d |
| Amount of mean curvature ∈ ]0.5; 1.0] | Family 2a | Family 2b | Family 2c | Family 2d |
| Amount of mean curvature ∈ ]1.0; 2.0] | Family 3a | Family 3b | Family 3c | Family 3d |
| Amount of mean curvature ∈ ]2.0; 4.0] | Family 4a | Family 4b | Family 4c | Family 4d |

TABLE 2

|  | |Y1| = 0.2, |Y2| = 0.9 | |Y1| = 0.2, |Y2| = 0.8 | |Y1| = 0.2, |Y2| = 0.7 | |Y1| = 0.2, |Y2| = 0.5 |
|---|---|---|---|---|
| Amount of mean curvature ∈ ]0.2; 0.5] | Family 1e | Family 1f | Family 1g | Family 1h |
| Amount of mean curvature ∈ ]0.5; 1.0] | Family 2e | Family 2f | Family 2g | Family 2h |
| Amount of | Family 3e | Family 3f | Family 3g | Family 3h |

TABLE 2-continued

|  | \|Y1\| = 0.2, \|Y2\| = 0.9 | \|Y1\| = 0.2, \|Y2\| = 0.8 | \|Y1\| = 0.2, \|Y2\| = 0.7 | \|Y1\| = 0.2, \|Y2\| = 0.5 |
| --- | --- | --- | --- | --- |
| mean curvature ∈ ]1.0; 2.0] | | | | |
| Amount of mean curvature ∈ ]2.0; 4.0] | Family 4e | Family 4f | Family 4g | Family 4h |

TABLE 3

|  | \|Y1\| = 0.3, \|Y2\| = 0.9 | \|Y1\| = 0.3, \|Y2\| = 0.8 | \|Y1\| = 0.3, \|Y2\| = 0.7 | \|Y1\| = 0.3, \|Y2\| = 0.5 |
| --- | --- | --- | --- | --- |
| Amount of mean curvature ∈ ]0.2; 0.5] | Family 1i | Family 1k | Family 1l | Family 1m |
| Amount of mean curvature ∈ ]0.5; 1.0] | Family 2i | Family 2k | Family 2l | Family 2m |
| Amount of mean curvature ∈ ]1.0; 2.0] | Family 3i | Family 3k | Family 3l | Family 3m |
| Amount of mean curvature ∈ ]2.0; 4.0] | Family 4i | Family 4k | Family 4l | Family 4m |

The variability of coordinate Y1 may be important for stabilizer wings 200 that protrude from a fuselage, a fin, or a tail boom (e.g., fuselage 104, fin 131, or tail boom 121 of rotorcraft 100 of FIG. 1). For example, a stabilizer wing that protrudes from a tail boom may not have curvature values at Y values that would be inside the tail boom. Consequently, an embodiment may be chosen from a family that features a value for Y1 that lies outside of the tail boom.

As mentioned above, a rotor with N rotor blades creates N helix-shaped rotor tip vortex systems, and hence N rotor blade tip vortices pass by stabilizer wing 200 per rotor revolution. Accordingly, the unsteady aerodynamic loads at stabilizer wing 200 occur periodically with fundamental frequency N per rotor revolution.

Thanks to the curved shape of the quarter chord line, the shape of the periodic unsteady aerodynamic loads at the attachment of stabilizer wing 200 at a fin or a tail boom may have smoother peaks and reduced amplitudes compared to a stabilizer wing with a straight quarter chord line.

Figure 3A:
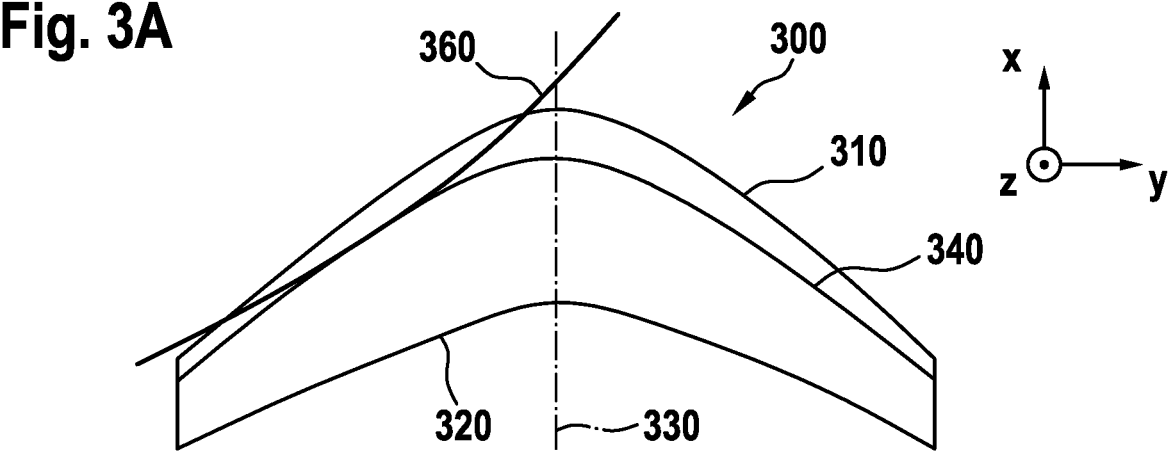
FIG. 3A is a diagram of an illustrative interaction between a rotor tip vortex center line reaching a quarter chord line with a non-zero curvature of a left half of a stabilizer wing in accordance with some embodiments.
Figure 3B:
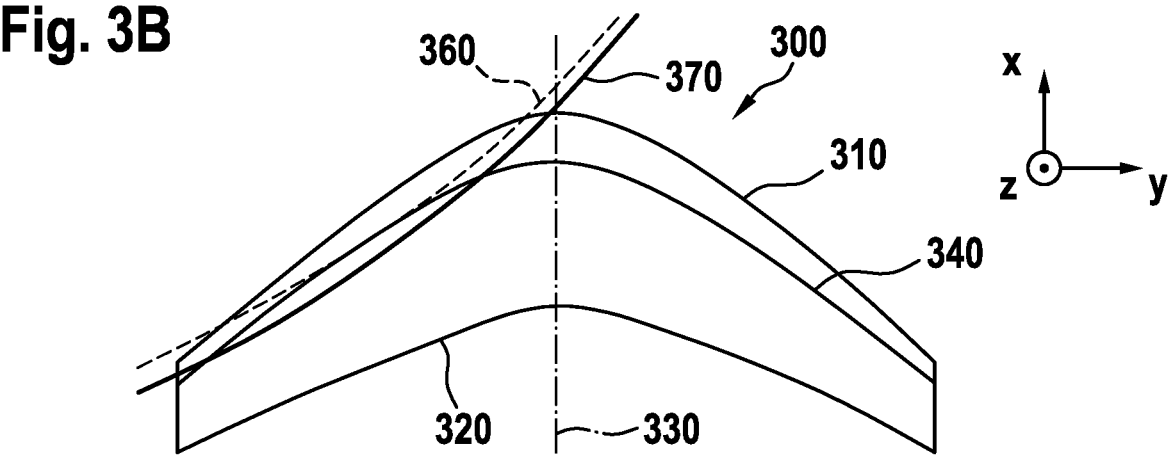
FIG. 3B is a diagram of an illustrative interaction between a rotor tip vortex center line passing over a quarter chord line with a non-zero curvature of a left half of a stabilizer wing in accordance with some embodiments.
Figure 3C:
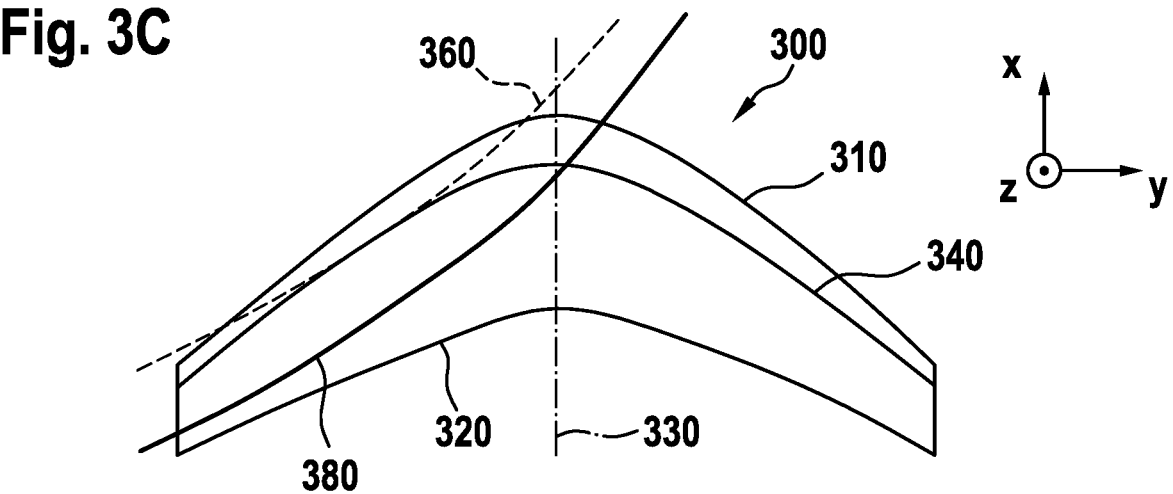
FIG. 3C is a diagram of an illustrative interaction between a rotor tip vortex center line reaching the intersection of a quarter chord line with a non-zero curvature of a stabilizer wing and the center line of a fuselage in accordance with some embodiments.

FIGS. 3A, 3B, and 3C are diagrams of an illustrative temporal sequence of interactions between a rotor tip vortex center line and a quarter chord line with a non-zero curvature. As shown in FIGS. 3A, 3B, and 3C, stabilizer wing 300 may have an arc-shaped leading edge 310, an arc-shaped trailing edge 320, and quarter chord line 340. Illustratively shown is center line 330 of the fuselage to which stabilizer wing 300 is symmetrical. Hence, quarter chord line 340 is symmetrical to center line 330.

Considering that the rotorcraft stands on its landing gear, a rotor may turn counter-clockwise when looked upon from above or may turn clockwise when looked upon from above.

FIG. 3A shows rotor tip vortex center line 360 reaching quarter chord line 340. In this initial situation (i.e., T=T1) the rotor tip vortex center line 360 is tangent to quarter chord line 340 and the interaction between rotor tip vortex center line 360 and quarter chord line 340 starts.

FIG. 3B shows rotor tip vortex center line 370 passing over quarter chord line 340 a short time after the interaction has started (i.e., at T=T2 with T2>T1).

FIG. 3C shows rotor tip vortex center line 380 when the interaction with quarter chord line 340 ends and the rotor tip vortex center line 380 reaches the intersection of quarter chord line 340 and center line 330 (i.e., at T=T3 with T3>T2).

The rotor tip vortex center line 360, 370, 380 travels for a longer time (i.e., T1 to T3) and a longer distance over curved quarter chord line 340 of stabilizer wing 300 than over a comparable straight quarter chord line of a comparable stabilizer wing.

Thus, rotor tip vortex center line 360, 370, 380 interacts for a longer duration with the curved quarter chord line 340 than it would interact with a straight quarter chord line. The longer duration of the interaction between rotor tip vortex center line 360, 370, 380 and quarter chord line 340 implies, at one particular time instant, a comparatively locally more restricted impact on the quarter chord line 340, and thus a smaller aerodynamic load input on stabilizer wing 300.

In contrast, if the duration of the interaction is short, or if in the extreme case the rotor tip vortex center line 360 and the quarter chord line are nearly coincident for just a time instant (e.g., as it can occur more likely in the case of a straight quarter chord line than in the case of a properly curved quarter chord line), the aerodynamic load change is instantaneous as it occurs along the entire span of the stabilizer wing at nearly the same time instant, thereby causing short and intense aerodynamic load peaks.

The present embodiments of a stabilizer wing 300 with a curved quarter chord line 340 allow for a long interaction time (e.g., T1 to T3) between a rotor tip vortex center line 360, 370, 380 and stabilizer wing 300 by creating a large difference in curvature and orientation of the quarter chord line 340 from the curvature and orientation of the rotor tip vortex center lines 360, 370, 380.

FIGS. 3A, 3B, and 3C show the interaction between forward curved rotor tip vortex center line 360, 370, 380 at times T1, T2, and T3, respectively, and backward curved quarter chord line 340. Rotor tip vortex center lines with a forward curvature, as shown in FIGS. 3A, 3B, and 3C, are usually more relevant for a T-tail (i.e., a stabilizer wing that is attached on top of a fin) in cruise flight, because forward-curved rotor tip vortex center lines are generated at the rear edge of the rotor disk and a T-tail stabilizer wing is geometrically close to the rear rotor edge.

Therefore, a T-tail stabilizer wing with a backward curved quarter chord line may be less affected by the rotor tip vortex center lines generated at the rear edge of the rotor disk than a stabilizer wing with a straight quarter chord line.

However, a rotor also generates rotor tip vortex center lines with backward curvature. For example, a rotor may generate rotor tip vortex center lines with a backward curvature at the front edge of the rotor disk.

A stabilizer wing that is attached such that it interacts in many flight conditions with vortices generated at the front edge of the rotor disk may interact for a longer time with these backward curved rotor tip vortex center lines if the stabilizer wing's quarter chord line has a forward curvature. Therefore, a stabilizer wing with forward curvature may experience lower aerodynamic load peaks when exposed to rotor tip vortex center lines with backward curvature.

Consider the scenario in which the rotorcraft is a helicopter with one main rotor. Consider further that the main rotor center of the main rotor coincides with the center line of the fuselage (e.g., main rotor center 103 coincides with center line 130 of fuselage 104 of FIG. 1C) and that, due to the asymmetrical nature of the main rotor with respect to the mid-plane of the helicopter, the rotor tip vortex center lines shed by the main rotor are not symmetric to the center line of the fuselage.

In this scenario, the curvature shape of the quarter chord line 340 and thus the planform of stabilizer wing 300 may be tailored towards the minimization of aerodynamic loads. As an example, the planform of stabilizer wing 300 may be designed such that, based on the operation of the rotorcraft, the total aerodynamic loads (e.g., obtained by integration over the wing span of stabilizer wing 300) at a predetermined location (e.g., the attachment position of stabilizer wing 300) do not exceed a predetermined value.

As another example, the planform of stabilizer wing 300 may be designed such that, based on the operation of the rotorcraft, the temporal sequence of the local interactions between the rotor tip vortex center lines 360, 370, 380 and the quarter chord line 340 at each location of stabilizer wing 300 is suitably staggered to achieve a near constant total aerodynamic load at the relevant location of stabilizer wing 300 in time.

As shown in FIGS. 2, 3A, 3B, and 3C, the stabilizer wing may be tapered. In other words, the chord length 250 may be longer at center line 230 than at wing tips 260, or the ratio of chord length 250 at wing tips 260 divided by chord length 250 at center line 230 may be smaller than one. As an example, the ratio of chord length 250 at wing tips 260 divided by chord length 250 at center line 230 may be in the interval between 0.2 and 0.8.

However, even though the stabilizer wing 200, 300 shown in FIGS. 2, 3A, 3B, and 3C is tapered, a curved quarter chord line 240, 340 may be combined with any kind of spanwise chord length evolution.

Figure 4:
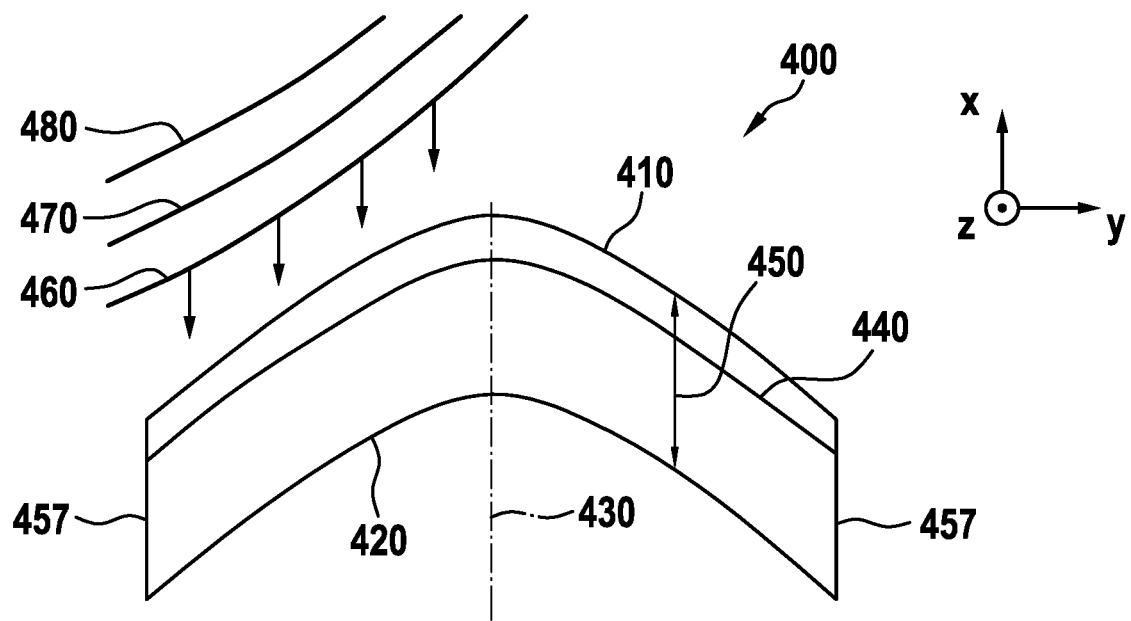
FIG. 4 is a diagram of a series of rotor tip vortex center lines reaching an illustrative stabilizer wing having a constant chord length and a quarter chord line with a non-zero curvature in accordance with some embodiments.

As an example, FIG. 4 is a diagram of a series of rotor tip vortex center lines 460, 470, 480 reaching an illustrative stabilizer wing 400 with a constant chord length 450 in accordance with some embodiments. In other words, stabilizer wing 400 may have a constant chord length 450 between the left and right wing tips 457 of the stabilizer wing 400.

As shown in FIG. 4, stabilizer wing 400 may have an arc-shaped leading edge 410, an arc-shaped trailing edge 420, and a quarter chord line 440 with a non-zero curvature. Illustratively shown is center line 430 of the fuselage to which stabilizer wing 400 is symmetrical. Hence, quarter chord line 440 is symmetrical to center line 430.

By way of example, chord length 450 may be constant at any span station Y (i.e., everywhere between Y=−1 and Y=1). In this example, since stabilizer wing 400 has an arc-shaped leading edge 410 and a constant chord length 450 at any span station Y, leading edge 410, trailing edge 420 and quarter chord line 440 have the same arc shape and the same non-zero curvature.

As shown in FIGS. 2, 3A, 3B, 3C, and 4, the stabilizer wing 200, 300, 400 may be symmetrical to the center line 230, 330, 430. However, the stabilizer wing may be asymmetrical to the center line, if desired.

Figure 5:
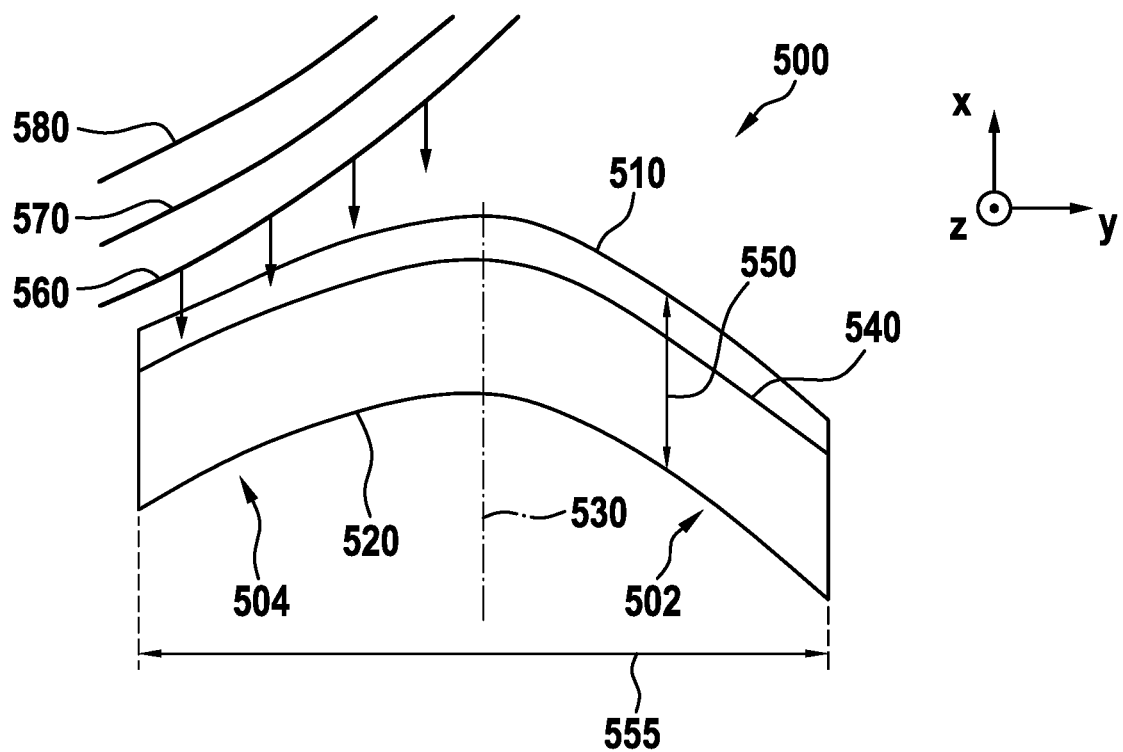
FIG. 5 is a diagram of a series of rotor tip vortex center lines reaching an illustrative stabilizer wing having an asymmetric sweep between the left and right half wings in accordance with some embodiments.

As an example, FIG. 5 is a diagram of a series of rotor tip vortex center lines 560, 570, 580 reaching an illustrative stabilizer wing 500 having an asymmetric sweep between the left and right half wings 504, 502 in accordance with some embodiments.

In fact, as shown in FIG. 5, stabilizer wing 500 may have a left half wing 504 that has a first sweep and a right half wing 502 that has a second sweep that is different than the first sweep. As an example, left half wing 504 may have a lower sweep than right half wing 502. If desired, left half wing 504 may have a higher sweep than right half wing 502.

As shown in FIG. 5, stabilizer wing 500 may have an arc-shaped leading edge 510, an arc-shaped trailing edge 520, and a quarter chord line 540 with a non-zero curvature.

As an example, stabilizer wing 500 may have a constant chord length 550. If desired, chord length 550 may be constant at any span station Y (i.e., everywhere between Y=−1 and Y=1). In this example, since stabilizer wing 500 has an arc-shaped leading edge 510 and a constant chord length 550 at any span station Y, leading edge 510, trailing edge 520 and quarter chord line 540 have the same arc shape and the same non-zero curvature.

However, since stabilizer wing 500 is asymmetrical to center line 530, left half wing 504 has a quarter chord line 540 with a first curvature, and right half wing 502 has a quarter chord line 540 with a second curvature, whereby the second curvature is different than the first curvature.

For example, right half wing 502 may have a higher curvature of quarter chord line 540 than left half wing 504. If desired, right half wing 502 may have a lower curvature of quarter chord line 540 than left half wing 504.

If desired, left half wing 504 may have a first length and right half wing 502 may have a second length that is different than the first length. In other words, one of left half wing 504 and right half wing 502 may contribute more than 50% to wing span 555. As an example, left half wing 504 may be shorter than right half wing 502. As another example, right half wing 502 may be shorter than left half wing 504.

The lengths of right and left half wings 502, 504 may be selected to equalize the contribution of the aerodynamic loads on right and left half wings 502, 504 to the roll moment around the attachment of the stabilizer wing 500 (e.g., at the fin, the tailboom, or the fuselage of a rotorcraft). A reduction of either the static and/or the dynamic component of the aerodynamic load at the stabilizer wing's attachment may be determined based on structural needs.

If desired, stabilizer wing 500 may include winglets (e.g., winglets 138 of FIG. 1). Winglets may increase the aerodynamic lift of stabilizer wing 500 without increasing the wing span 555.

Since the wing span 555 and, more particularly the length of the right and left half wings 502, 504, respectively, defines the effective lever arm for the roll moments at the attachment of stabilizer wing 500, and since the winglet orientation is perpendicular to the rotor tip vortex center lines 560, 570, 580, which limits the interaction between the rotor tip vortex center lines 560, 570, 580 and the winglets, the use of winglets has the potential to reduce oscillating roll moments at the attachment of stabilizer wing 500 for a given target of aerodynamic lift.

The asymmetry in curvature of quarter chord line 540 and/or sweep between right half wing 502 and left half wing 504 may be exploited to further reduce unsteady aerodynamic loads on stabilizer wing 500.

For example, selecting a combination of a predetermined curvature of quarter chord line 540 and predetermined sweep for left and right half wings 504, 502 may allow to independently adjust the temporal sequence of the interactions between the rotor tip vortex center lines 560, 570, 580 along the span stations Y of the left and right half wings 504, 502 of stabilizer wing 500.

To explain the effect, a previously symmetric stabilizer wing may be considered turned by a certain angle $\psi$ compared to the center line of the fuselage, which results in an asymmetry of the sweep.

Figure 6:
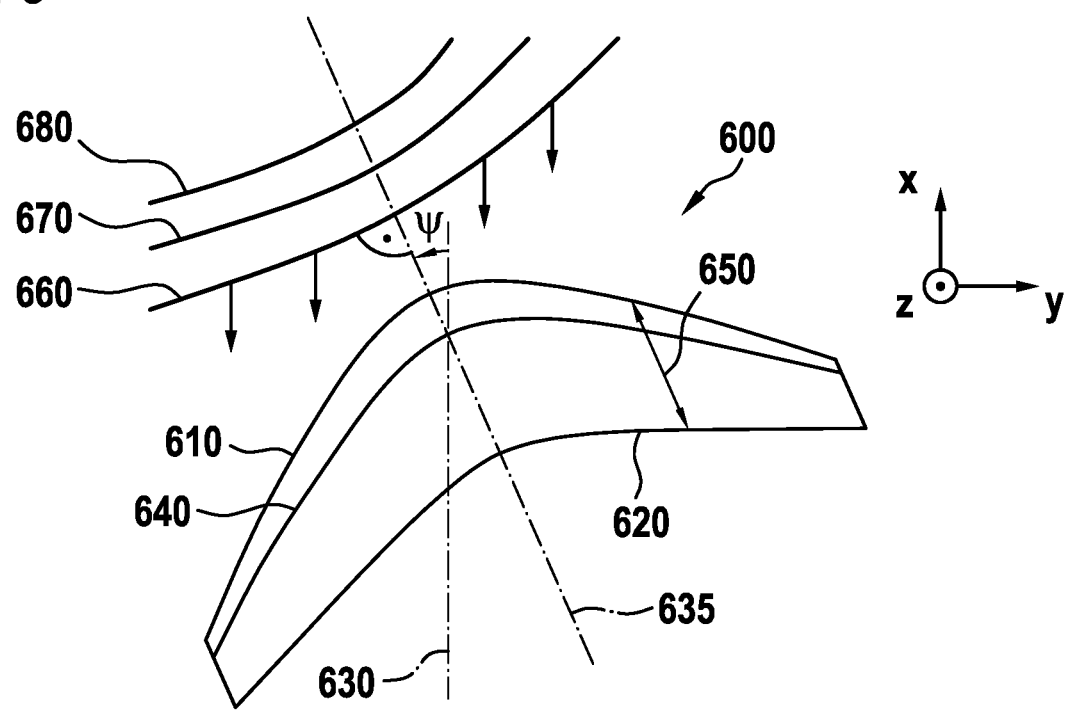
FIG. 6 is a diagram of an illustrative stabilizer wing having a tapered chord length, a quarter chord line with a non-zero curvature, and a wing center line that is perpendicular to a series of rotor tip vortex center lines in accordance with some embodiments.

FIG. 6 is a diagram of an illustrative stabilizer wing 600 having a quarter chord line 640 with a non-zero curvature and a wing center line 635 that is perpendicular to a series of rotor tip vortex center lines 660, 670, 680 in accordance with some embodiments.

By way of example, stabilizer wing 600 may have a tapered chord length 650. If desired, chord length 650 may decrease from the wing center line 635 towards the wing tips (i.e., the chord length 650 decreases with an increase in the distance from wing center line 635). In this example, leading edge 610, trailing edge 620, and quarter chord line 640 may all have a different arc shape and a different non-zero curvature.

As shown in FIG. 6, stabilizer wing 600 may be symmetrical to wing center line 635. Since, wing center line 635 is turned by an angle ψ compared to the center line 630 of the fuselage, stabilizer wing 600 may be asymmetrical to center line 630 of the fuselage.

Since wing center line 635 is perpendicular to the series of rotor tip vortex center lines 660, 670, 680, each one of rotor tip vortex center lines 660, 670, 680 arrive at both half wings of stabilizer wing 600 at the same time. Thereby, the bending moments around the wing center line 635 of stabilizer wing 600 are occurring temporally in phase.

As shown in FIG. 6, stabilizer wing 600 may be turned compared to the center line 630 of the fuselage such that the rotor tip vortex center lines 660, 670, 680 are perpendicular to wing center line 635. The actual turning angle ψ between wing center line 635 and center line 630 of the fuselage may be dependent on the actual configuration of the rotorcraft.

As an example, an angle ψ between 0° and 30° may be selected for a rotorcraft having one main rotor that has a main rotor center at the center line 630 of the fuselage in front of stabilizer wing 600 and turns counter-clockwise when looked upon from above. As another example, an angle ψ between 0° and −30 may be selected for a rotorcraft having one main rotor that has a main rotor center at the center line 630 of the fuselage in front of stabilizer wing 600 and turns clockwise when looked upon from above.

The elasticity of the stabilizer wing 200, 300, 400, 500, or 600 shown in FIGS. 2 to 6 may affect the aerodynamic load, since the curvature of the quarter chord line 240, 340, 440, 540, 640 can lead to a coupled response in bending and torsion. Thus, a vertical flexing of the stabilizer wing 200, 300, 400, 500, 600, due to the aerodynamic loads may be accompanied by an elastic twisting of the stabilizer wing around the Y axis. Providing a stabilizer wing that allows an elastic twisting and/or that has a twisted structure around the Y axis at the attachment of the stabilizer wing may reduce the aerodynamic loads, because the twisting may change the angles of attack and hence the aerodynamic loads on the stabilizer wing.

If desired, stabilizer wing 200, 300, 400, 500, or 600 of FIGS. 2 to 6 may have a twist, which is a variation of the angles between the chord lines and the horizontal XY plane for different span stations Y. In other words, stabilizer wing 200, 300, 400, 500, or 600 may have a variable incidence over at least a portion of the wing span.

If desired, stabilizer wings 200, 300, 400, 500, or 600 of FIGS. 2 to 6 may have a twist in addition to a quarter chord line 240, 340, 440, 540, or 640 with a non-zero curvature. The additional twist of stabilizer wings 200, 300, 400, 500, or 600 may compensate the asymmetric inflow situation on the left and right half wings of the respective stabilizer wing 200, 300, 400, 500, or 600.

Consider the scenario in which a rotor wake is not symmetrical relative to the center line of the fuselage. For example, as shown in FIG. 5, a rotor wake that generates rotor tip vortex center lines 560, 570, 580 is not symmetrical to a plane defined by center line 530 of the fuselage and the Z axis.

In this scenario, the rotor tip vortex center lines 560, 570, 580 may lead to asymmetric average aerodynamic loads between the left half wing 504 and the right half wing 502 in case of a non-twisted horizontal stabilizer wing.

By way of example, stabilizer wing 500 may equalize the time average of the lift and root moment of the left and right half wings 504, 502 at the attachment of stabilizer wing 500 for the most relevant flight states (e.g., level forward flight) through the curved quarter chord line 540 and the variable incidence over the wing span 555, thereby reducing the combined static roll moment that is exerted by left and right half wings 504, 502 at the attachment of stabilizer wing 500.

If desired, the stabilizer wing 200, 300, 400, 500, 600 of FIGS. 2 to 6 may include a spanwise distribution of incidence angles. The spanwise distribution of incidence angles may reduce the risk of flow separation at the stabilizer wing's root. The danger of flow separation increases with the amount of negative pressure on a stabilizer wing.

Illustratively, the angle-of-attack may be reduced in direction from the wing tips of stabilizer wing 200, 300, 400, 500, or 600 of FIGS. 2 to 6 to the stabilizer wing's root in order to reduce the amount of negative pressure generated at the lower surface of the stabilizer wing's root.

The portion of the stabilizer wing's surface that is close to the stabilizer wing's root is particularly prone to flow separation if the stabilizer wing is mounted to the fin of a rotorcraft. In fact, a low-pressure field of the fin extends onto the stabilizer wing's surface part close to the stabilizer wing's root in addition to the low-pressure induced by the stabilizer wing itself.

The fin of a rotorcraft may provide antitorque against the torque of a rotor. For example, the fin may generate a force to the right (i.e., in positive Y direction) in a rotorcraft with a rotor that rotates counter-clockwise when seen from above. In fact, the force generated by the fin is achieved by a negative pressure on the right surface of the fin.

In this example, an incidence angle of zero degrees between the chord of the stabilizer wing and the XY plane may be on the right side of the fin (i.e., at a span station with a positive Y). If desired, the incidence angle between the chord of the stabilizer wing and the XY plane may continuously increase from the span station where the incidence angle is zero degrees towards the left wing tip (i.e., in negative Y direction) and continuously decrease from the span station where the incidence angle is zero degrees towards the right wing tip (i.e., in positive Y direction).

Alternatively, for a rotor rotating clockwise when seen from above, the left fin surface would be subjected to negative pressure. Accordingly, an incidence angle of zero degrees between the chord of the stabilizer wing and the XY plane may be on the left side of the fin (i.e., at a span station with a negative Y).

If desired, the incidence angle between the chord of the stabilizer wing and the XY plane may continuously increase from the span station where the incidence angle is zero degrees towards the right wing tip (i.e., in positive Y direction) and continuously decrease from the span station where the incidence angle is zero degrees towards the left wing tip (i.e., in negative Y direction).

The incidence angle distributions over the stabilizer wing span may be shifted as a whole along the ordinate (i.e., shifted along the Y axis to uniformly increase or decrease the incidence angle across the entire wing span), which does not change the variation along the abscissa (i.e., the twist along the X axis), but only the overall incidence and thus the lift of the complete stabilizer wing.

By way of example, the incidence angle may have a greater change towards the stabilizer wing's root than towards the stabilizer wing's tips. In other words, for a given incidence angle θ and transversal axis Y from Y=−1 at the left wing tip to Y=1 at the right wing tip of the stabilizer wing, the change in incidence angle dθ/dY is greater than the mean twist (i.e., θ(Y=−1)−θ(Y=1))/2) in the spanwise region Y=[−0.5 . . . 0.5], Illustratively, the incidence angle distribution over the stabilizer wing span may have predetermined upper and lower boundaries. If desired, an actual incidence angle distribution over the stabilizer wing span may be selected that lies between the predetermined upper and lower boundaries. The selection of the actual incidence angle distribution over the stabilizer wing may be selected based on the predominant flight mode, for example.

It should be noted that the above-described embodiments are merely described to illustrate possible realizations of the present invention, but not in order to restrict the present invention thereto. Instead, multiple modifications and variations of the described embodiments are possible and should, therefore, also be considered as being part of the invention.

By way of example, asymmetrical stabilizer wing 500 of FIG. 5 is shown with a constant chord length 550. However, asymmetrical stabilizer wing 550 may be tapered, if desired. Similarly, stabilizer wing 600 of FIG. 6 is shown tapered. However, stabilizer wing 600 may have a constant chord length, if desired.

As another example, stabilizer wings 200, 300, 400, 500, 600 of FIGS. 2 to 6 are shown with a predetermined sweep. If desired, stabilizer wings 200, 300, 400, 500, 600 may have a different sweep. For example, stabilizer wings 200, 300, 400, 500, 600 may have a greater sweep or a smaller sweep than shown in FIGS. 2 to 6.

Moreover, a lower bound for the absolute value of the non-zero curvature of the quarter chord line 240 of stabilizer wing 200 of Figure has been given as 0.2 (i.e., |d/dY (f(Y))|>0.2), and an upper bound for the absolute value of the non-zero curvature of the quarter chord line 240 has been given as 4 (i.e., |d/dY (f(Y))|<4).

However, the lower bound for the absolute value of the non-zero curvature of the quarter chord line 240 may be selected to be greater or smaller than 0.2. Similarly, the upper bound for the absolute value of the non-zero curvature of the quarter chord line 240 may be selected to be greater or smaller than 4. If desired, the lower and upper bounds for the absolute value of the non-zero curvature of the quarter chord line 240 may be selected based on the shape of the rotor tip vortex center lines.

Similarly, the absolute value of the non-zero curvature of the quarter chord line 240 may have an upper limit based on the distance from center line 230 and the factor by which the upper limit decreases may be a factor A which may be selected from the interval]0; B[, with B being the upper bound for the absolute value of the non-zero curvature of the quarter chord line 240. For example, the absolute value of the non-zero curvature of the quarter chord line 240 may be smaller than B−(B−C)*|Y| with B∈ [1; 4] and C∈ [0; 1] (i.e., |d/dY (f(Y))|<B−(B−C)*|Y|).

REFERENCE LIST 100 rotorcraft
102 main rotor
102a, 102b, 102c, 102d, 102e rotor blades
103 main rotor center
103a rotor mast axis
104 fuselage
104a cabin
107 fuselage nose
108 nose region
109 aft region
121 tail boom
122 tail rotor
130 center line
131 fin
132 rudder
133 tail wing, stabilizer wing
136 leading edge
137 trailing edge
138 winglet
160 wing tip
200 stabilizer wing
210 leading edge
220 trailing edge
230 center line
240 quarter chord line
250 chord length
255 wing span
257 half wing span (left half wing)
258 half wing span (right half wing)
260 wing tip
270 distance
272, 274, 276, 278 points on quarter chord line
282 distance amounting to 10% of the wing span
284 distance amounting to 30% of the wing span
286 distance amounting to 50% of the wing span
288 distance amounting to 70% of the wing span
290 straight line
300 stabilizer wing
310 leading edge
320 trailing edge
330 center line
340 quarter chord line
360, 370, 380 rotor tip vortex center line
400 stabilizer wing
410 leading edge
420 trailing edge
430 center line
440 quarter chord line
450 chord length
457 wing tip
460, 470, 480 rotor tip vortex center line
500 stabilizer wing
502 right half wing
504 left half wing
510 leading edge
520 trailing edge
530 center line
540 quarter chord line
550 chord length
555 wing span
560, 570, 580 rotor tip vortex center line
600 stabilizer wing
610 leading edge
620 trailing edge
630 fuselage center line
635 wing center line
640 quarter chord line
650 chord length
660, 670, 680 rotor tip vortex center line
X longitudinal axis, length axis
Y transversal axis, lateral axis, width axis
Z vertical axis, height axis

What is claimed is:

1. A helicopter, comprising:
   a fuselage having a center line, a nose region and a rear region;
   a main rotor that generates vortices during operation, the main rotor disposed above the fuselage between the nose region and the rear region; and
   a stabilizer wing that is connected to the fuselage;
   wherein:
   the stabilizer wing is provided with:
   a left wing tip,
   a right wing tip,
   a quarter chord line with a non-zero curvature, the non-zero curvature of the quarter chord line leading to reduced unsteady aerodynamic loads caused by the wake of the main rotor on the stabilizer wing relative to a stabilizer with a straight quarter chord line, such that an interaction between the vortices generated by the main rotor and the quarter chord line is spread out over time,
   a leading edge that is arc-shaped,
   a trailing edge that is arc-shaped, and
   wherein the quarter chord line of the stabilizer wing is closer to the aft region at at least one of the left or right wing tips than at the center line of the fuselage.

2. The helicopter of claim 1, wherein an absolute value of the non-zero curvature of the quarter chord line is greater than 0.2, wherein the quarter chord line is a function and the curvature is the second derivative of the function.

3. The helicopter of claim 2, wherein the absolute value of the non-zero curvature of the quarter chord line is smaller than 4.

4. The helicopter of claim 1, wherein the non-zero curvature of the quarter chord line evolves from a first value at a first distance from the center line of the fuselage to a second value at a second distance from the center line of the fuselage such that the non-zero curvature of the quarter chord line is non-constant between the first and second distance from the center line of the fuselage.

5. The helicopter of claim 1, wherein the stabilizer wing has a half wing span between the center line and a wing tip of the left or right wing tips, wherein first, second, third, and fourth points are located on the quarter chord line at first, second, third, and fourth distances from the center line of the fuselage, respectively, wherein the first, second, third, and fourth distances amount to 10%, 30%, 50%, and 70% of the half wing span, respectively, wherein the non-zero curvature of the quarter chord line is non-zero between the first and fourth points, and wherein a straight line between the first and fourth points has a fifth distance from the quarter chord line between the second and third points that is greater than 2% of the half wing span.

6. The helicopter of claim 1, wherein the quarter chord line is symmetrical to the center line of the fuselage.

7. The helicopter of claim 1, wherein the stabilizer wing is mounted to at least one of the fuselage, a tail boom that is attached to the fuselage, or a vertical fin that is attached to the tail boom.

8. The helicopter of claim 1, wherein the stabilizer wing has a constant chord length between the left and right wing tips of the stabilizer wing.

9. The helicopter of claim 1, wherein the stabilizer wing has a chord length that decreases from the center line of the fuselage towards the left and right wing tips of the stabilizer wing.

10. The helicopter of claim 1, wherein the stabilizer wing further comprises:
    a left half wing having a first sweep; and
    a right half wing having a second sweep that is different than the first sweep.

11. The helicopter of claim 10, wherein the left half wing has a quarter chord line with a first curvature, wherein the right half wing has a quarter chord line with a second curvature, and wherein the second curvature is different than the first curvature.

12. The helicopter of claim 10, wherein the left half wing has a first length and the right half wing has a second length that is different than the first length.

13. The helicopter of claim 1, wherein the stabilizer wing further comprises winglets.

14. The helicopter of claim 1, wherein the single main rotor is the only rotor to provide lift during operation.

15. A helicopter, comprising:
    a fuselage having a center line;
    a main rotor that generates vortices during operation; and
    a stabilizer wing that is connected to the fuselage;
    wherein:
    the stabilizer wing is provided with:
    a left wing tip,
    a right wing tip,
    a quarter chord line with a non-zero curvature, the non-zero curvature of the quarter chord line leading to reduced unsteady aerodynamic loads caused by the wake of the main rotor on the stabilizer wing relative to a stabilizer with a straight quarter chord line, such that an interaction between the vortices generated by the main rotor and the quarter chord line is spread out over time,
    a leading edge that is arc-shaped, and
    a trailing edge that is arc-shaped;
    wherein the stabilizer wing further comprises:
    a left half wing having a first sweep; and
    a right half wing having a second sweep that is different than the first sweep; and
    wherein the left half wing has a quarter chord line with a first curvature, wherein the right half wing has a quarter chord line with a second curvature, and wherein the second curvature is different than the first curvature.

16. A helicopter comprising:
    a fuselage having a nose region and a center line;
    a tail boom connected to the fuselage;
    a single rotor generating lift during operation, the single rotor disposed above the fuselage between the nose region and the tail boom; and
    a stabilizer wing that is connected to the tail boom, the stabilizer wing having:
    a left wing tip having a left wing tip end surface,
    a right wing tip having a right wing tip end surface,
    a quarter chord line with a non-zero curvature,
    a leading edge that is arc-shaped,
    a trailing edge that is arc-shaped, and
    wherein the quarter chord line of the stabilizer wing is closer to the aft region at least one of the left or right wing tips than at the center line of the fuselage.

17. The helicopter of claim 16, wherein the single rotor is the only rotor to provide lift during operation.

18. The helicopter of claim 16, wherein the stabilizer wing comprises a left half wing having a quarter chord line with a first curvature, and a right half wing having a quarter chord line with a second curvature different than the first curvature.

* * * * *